US006826644B1

(12) United States Patent
Arramreddy et al.

(10) Patent No.: US 6,826,644 B1
(45) Date of Patent: Nov. 30, 2004

(54) PERIPHERAL COMPONENT INTERCONNECT ARBITER IMPLEMENTATION WITH DYNAMIC PRIORITY SCHEME

(75) Inventors: Sujith K. Arramreddy, San Jose, CA (US); Appanagari Raghavendra, Sunnyvale, CA (US)

(73) Assignee: ServerWorks Corporation, Santa Clara, CA (US)

( * ) Notice: Subject to any disclaimer, the term of this patent is extended or adjusted under 35 U.S.C. 154(b) by 353 days.

(21) Appl. No.: 09/637,846

(22) Filed: Aug. 10, 2000

(51) Int. Cl.$^7$ .............................................. G06F 13/14
(52) U.S. Cl. ....................................... 710/244; 710/240
(58) Field of Search ................................ 710/240–246, 710/107, 116, 112, 309, 111, 310, 113–114, 119

(56) References Cited

U.S. PATENT DOCUMENTS

| | | | | |
|---|---|---|---|---|
| 5,592,631 A | * | 1/1997 | Kelly et al. ................. | 710/113 |
| 5,761,452 A | | 6/1998 | Hooks et al. | |
| 5,848,297 A | * | 12/1998 | Krein et al. .................. | 710/56 |
| 5,850,530 A | * | 12/1998 | Chen et al. .................. | 710/113 |
| 5,872,937 A | * | 2/1999 | Jaramillo ..................... | 710/107 |
| 5,930,487 A | * | 7/1999 | Story et al. ................. | 710/120 |
| 5,933,610 A | * | 8/1999 | Chambers et al. .......... | 711/113 |
| 5,970,234 A | * | 10/1999 | Jin .............................. | 710/111 |
| 5,987,555 A | * | 11/1999 | Alzien et al. ............... | 710/312 |
| 6,141,715 A | * | 10/2000 | Porterfield .................. | 710/113 |
| 6,178,477 B1 | * | 1/2001 | Jaramillo et al. ........... | 710/310 |
| 6,199,127 B1 | * | 3/2001 | Ajanovic ..................... | 710/100 |
| 6,393,506 B1 | * | 5/2002 | Kenny ......................... | 710/113 |
| 2003/0018863 A1 | * | 1/2003 | Hill et al. ................... | 711/158 |

OTHER PUBLICATIONS

European Search Report, Sep. 10, 2003.

\* cited by examiner

Primary Examiner—Mark H. Rinehart
Assistant Examiner—Kim T. Huynh
(74) Attorney, Agent, or Firm—Christie, Parker & Hale, LLP

(57) ABSTRACT

A dynamic priority scheme is provided that uses information including the status of the target and data availability in deciding which PCI master should be assigned ownership of the bus. The target uses delayed transactions to complete a read access targeted to it. The target also integrates a buffer management scheme, in one embodiment an input/output cache, for buffer management. The present invention optimizes the performance and utilization of the PCI bus.

16 Claims, 5 Drawing Sheets

PERIPHERAL COMPONENT INTERCONNECT ARBITER IMPLEMENTATION WITH DYNAMIC PRIORITY SCHEME

BACKGROUND OF THE INVENTION

1. Field of the Invention

The present invention relates to a peripheral component interconnect (PCI) arbiter, and in particular to a PCI arbiter with a dynamic priority scheme.

2. Discussion of the Related Art

A peripheral component interconnect (PCI) bus is an industry standardized expansion bus that conveys much of the information and signals of a computer system. Optimally, when the computer system executes its programming, information should flow as fast as possible to ensure the computer is responsive to the user. To prevent mistakes in the transmission of that information, a PCI bus design includes a special logic circuit and associated signals to control the flow of that information.

Specifically, a typical PCI bus allows a bus controller, also called an arbiter, to control bus transfers. A device that takes control of the bus to handle its own transfer is termed a "master", whereas a device that receives data from the master is termed a "target". The arbiter uses an algorithm to determine which master can take control of the bus and the time period of that control.

Arbitration must resolve the competing goals of fairness and priority. Fairness requires that one master should not be allowed to monopolize the bus. However, priority requires that, under certain circumstances, predetermined masters should use the bus more often to accomplish time critical goals. Some typical algorithms used by arbiters are the Single-Level Round Robin, the Multi-Level Round Robin, the Least Recently Used, and the Priority Based approaches.

In the Single Level Round Robin approach, a small unit of time, i.e. a quantum, is defined. All processes (associated with specific masters) are put in a circular queue. The arbiter follows the queue, and allocates the master's use of the bus to accomplish the process for a time interval of one quantum. Any new process is added after the last process in the queue.

If the process finishes before the end of the quantum, the master releases the bus voluntarily. However, if the process is still running at the end of the quantum, the master is preempted and the process is added to the end of the queue. In either case, the arbiter assigns the bus to the next process in the queue.

In the Multi-Level Round Robin approach, at least two circular queues are formed. For example, assuming first and second queues are formed, processes that use the bus frequently are placed in the first queue and processes that use the bus less frequently are placed in the second queue. Processes in the second queue have equal access to the bus, if in the same queue. However, the processes in the second queue, as a group, have equal access to the bus as each process in the first queue. In other words, the processes of the second queue effectively form a "super process", wherein the super process is deemed to be one of the processes in the first queue. Thus, for every round of the first queue processes, one process of the second queue is performed. In this approach, if the process finishes before the end of the quantum, the master releases the bus voluntarily. However, if the process is still running at the end of the quantum, the master is preempted and the process is added to the end of the appropriate queue.

In the Least Recently Used approach, an arbitrary queue is formed. The arbiter initially follows the queue and allows each process to finish before allowing the next master in the queue to get control of the bus. However, if the arbiter receives a request for bus control from a master not next in the queue, the arbiter gives control of the bus (after the completion of the process running) to the master that has least recently used the bus.

Finally, in a priority-based approach, the arbiter determines bus control based solely on the priority of the associated process performed by the master. In this approach, each process completes before the next process is initiated.

Each of the above-described approaches has its disadvantages. For example, in both the Single- and Multi-Level Round Robin approaches, a quantum may not allow a master time to finish a critical process. Therefore, completion of that critical process may take several complete cycles of the queue, thereby introducing significant inefficiency in the system.

In the Least Recently Used approach, processes that are non-critical get more bus control than in other approaches. Although this allows less frequently used processes an opportunity to complete, it also necessitates losing time resources for other more critical processes. Therefore, this approach also frequently results in significant inefficiencies in the system.

In the Priority Based approach, depending on the task to be completed by the system, non-critical processes may only rarely be run. Although these non-critical processes may relate only to processes such as expansion bus requests, sporadic or even non-completion of these processes may contribute to some system inefficiency.

All of these approaches use static algorithms to determine control of the bus. As noted above, each of these static algorithms fails to provide the flexibility to optimize system efficiency. Therefore, a need arises for a flexible, arbitration scheme that optimizes system efficiency.

SUMMARY OF THE INVENTION

The present invention provides a dynamic priority scheme that uses information including the status of the target and data availability in deciding which master should be assigned ownership of a PCI bus, thereby optimizing performance and utilization of the PCI bus. Specifically, the present invention provides multiple levels of master priority. In one embodiment, three levels of priority are provided: HIGH, MEDIUM, and LOW.

Once a request from a master is posted, an arbiter in the system issues a signal to the master. At this point, the arbiter in the system assigns the requesting master a MEDIUM priority and forwards the request to the target. The arbiter then determines if data is available from the target. If data is available, then the arbiter reassigns the requesting master a HIGH priority. However, if data is not available, then the arbiter reassigns the requesting master a LOW priority and ignores the requesting master until the arbiter is notified that data is available from the target.

In accordance with the present invention, each target includes a memory interface to facilitate the prioritization process. Specifically, upon receipt of a memory access request from a master (via the arbiter), the target stores this request in a request queue, which forms part of the memory interface, and then proceeds to capture the information needed to complete the access of the memory. After the data is copied in the request queue (i.e., the data is now available), the target generates a master ID for triggering a status change of the requesting master. In a preferred embodiment, the target generates the master ID using the request from the master (called a modified request). This master ID is then provided to the arbiter.

After the arbiter receives the modified request, the arbiter changes the priority of the master to HIGH and, assuming the PCI bus is available and no other masters have an earlier high priority, sends the requesting master a final grant signal, thereby allowing the master to take control of the PCI bus. Note that if the PCI bus is currently being controlled by another master or if other masters have an earlier high priority, then the arbiter sends the final grant signal at the next earliest time period after the process performed by the last controlling master is complete.

To further increase the efficiency of the present invention, the request queue may include an input/output cache. A cache controller keeps the cache filled with data or instructions that one or more masters are most likely to need next. In this manner, information can be retrieved without delay.

DETAILED DESCRIPTION OF THE DRAWINGS

Figure 1:
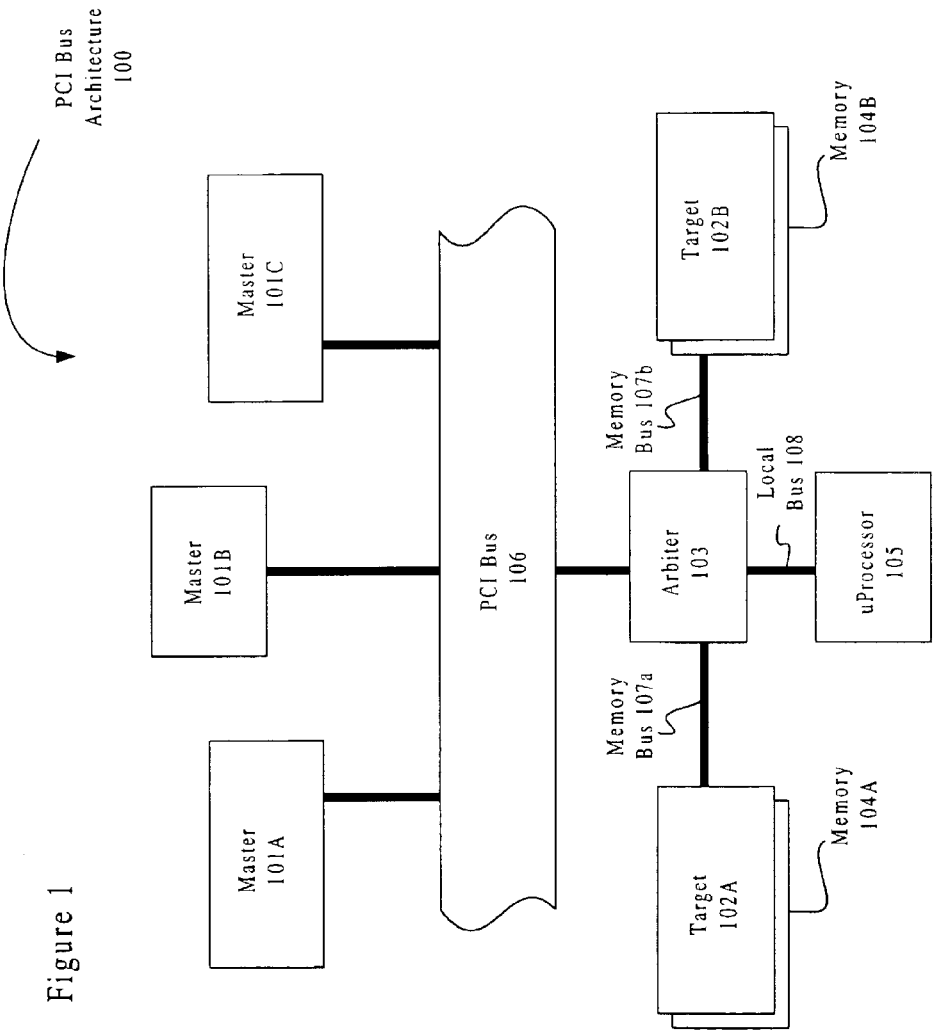
FIG. 1 illustrates a simplified diagram of a PCI bus architecture.

FIG. 1 illustrates a PCI bus architecture 100 including a PCI bus 106. Connected to PCI bus 106 are masters 101A, 101B, and 101C. A microprocessor 105 delegates arbitration of PCI bus 106 to an arbiter 103 (coupled to microprocessor 105 via a local bus 108) and is viewed by the system as another master in architecture 100. At this point, unless microprocessor 105 reassumes control, arbiter 103 assigns ownership of PCI bus 106 to requesting PCI masters.

Targets 102A and 102B, which can be accessed by any master, are connected to arbiter 103 via memory buses 107A and 107B, respectively. For purposes of this description, targets 102A and 102B include associated memories 104A and 104B, respectively.

Figure 2:
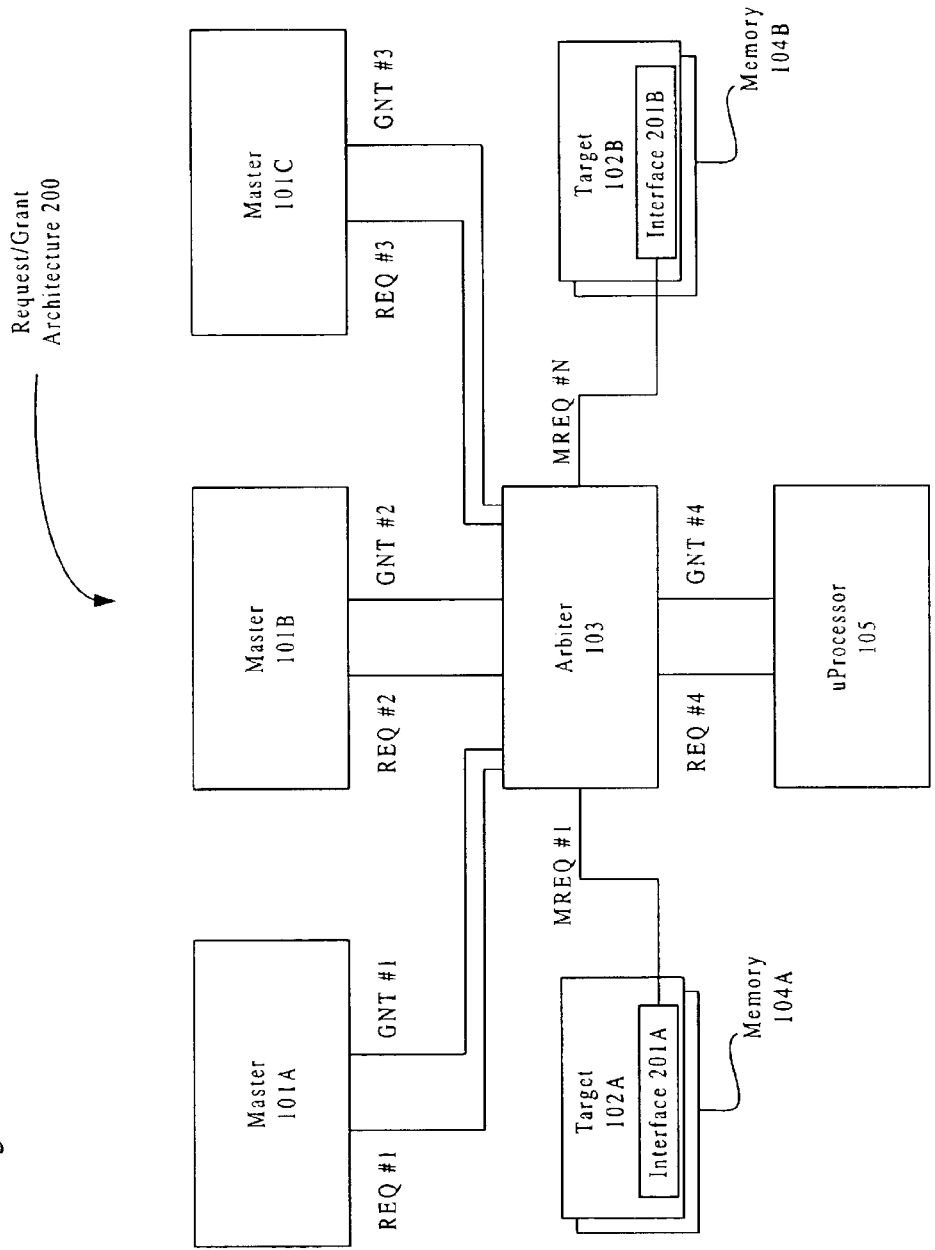
FIG. 2 illustrates a simplified diagram of a request/grant architecture.

In a PCI design, bus arbitration includes the following steps. A master asserts a request signal (REQ) when it wants to take control of the bus. The arbiter sends a grant signal (GNT) to the master when permission is granted to take control of the bus. Referring to FIG. 2, in a PCI bus, each master in request/grant architecture 200 has its own lines to request bus control and receive confirmation that control has been granted. Thus, each master has its own dedicated REQ# and GNT# lines, wherein # designates the master. When several masters request PCI bus ownership, each requesting master 101/103 asserts its respective request line. For example, master 101B makes its request using dedicated request line REQ#2. Arbiter 103 determines which master should get ownership of PCI bus 106 (FIG. 1) and asserts the grant line associated with that master. For example, master 101B receives its grant signal from arbiter 103 via line GNT#2 (note that, for convenience, both the request/grant lines and the signals thereon are referred using the same designators).

In accordance with the present invention, dynamic information, such as the state of the target the master is accessing and the availability of the data the master device is requesting, is incorporated into the arbitration algorithm, thereby greatly enhancing system performance and maximizing system efficiency. Specifically, the arbiter logic in the present invention includes multiple levels of master priority.

In one embodiment, three levels of priority are provided: HIGH, MEDIUM, and LOW. As explained in further detail below, a master that has a request posted in the request queue of the target, but does not have data available in the target, has a LOW priority. Any master which does not have its request posted in the request queue of the target has a MEDIUM priority. Finally, a master that has a request posted in the request queue of the target and data is available in the target has a HIGH priority.

Figure 3:
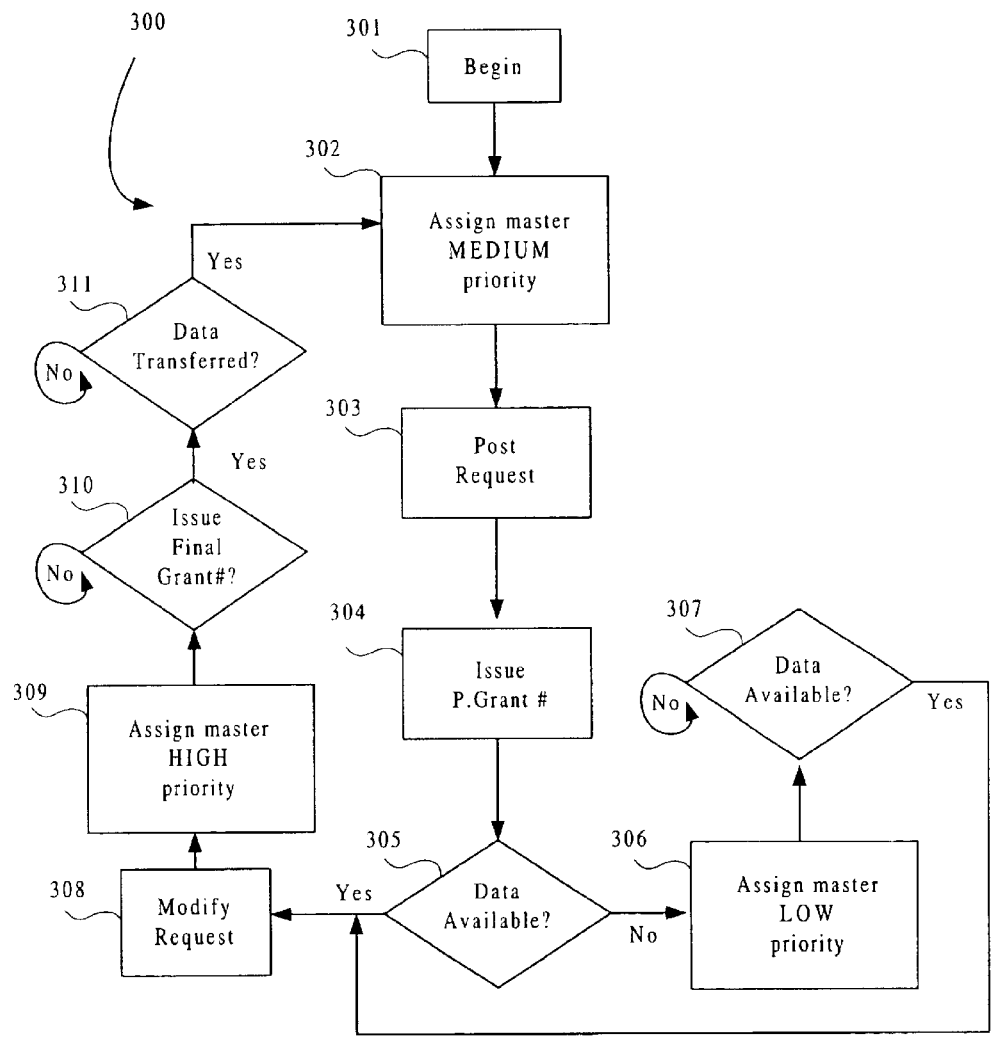
FIG. 3 illustrates a flow chart of the priority scheme for a requesting master.

FIG. 3 illustrates a flow chart 300 that summarizes the priority scheme for each master in accordance with the present invention. After the prioritization process begins in step 301, the arbiter assigns a MEDIUM priority to the master in step 302. At this point, the master is inactive until the master asserts a request signal when it wants to take control of the bus in step 303. After the arbiter sends a provisional grant signal to the master in step 304, the arbiter determines whether data is available from the target associated with the request in step 305.

Assuming data is not available, then the arbiter assigns a LOW priority to the master in step 306. The master maintains this priority until the target data is available, as determined in step 307. At this point, the request posted by the master is modified in step 308 (i.e., a master ID is generated) and sent to the arbiter. After receiving the modified request, the arbiter changes the priority of the master to a HIGH priority in step 309.

Assuming the PCI bus is available and no other HIGH priority masters have earlier rights to the bus as determined in step 310, the arbiter sends a final grant signal to the master, thereby allowing the master to take control of the PCI bus. After data is transferred from the target in step 311, the arbiter returns to step 302 and changes the priority of the master back to a MEDIUM priority. Note that if target data is available in step 305, then the arbiter immediately modifies the request in step 308 and then proceeds through steps 309–311 as described above.

Figure 4:
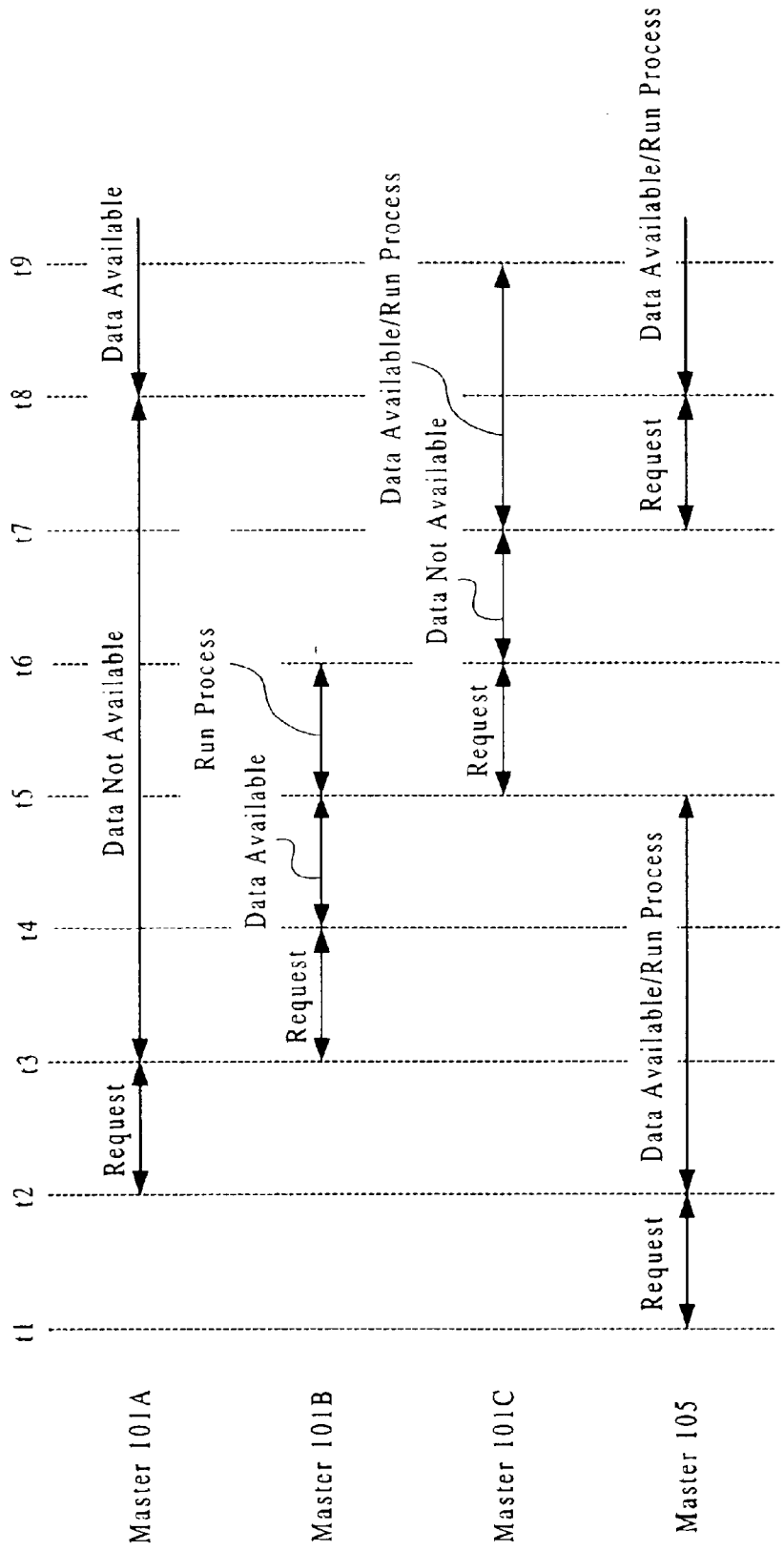
FIG. 4 illustrates an example prioritization process including four requesting masters.

FIG. 4 illustrates an example prioritization process in which masters 101A, 101B, 101C, and 105 (the microprocessor) each request bus control. At time t1, master 105 requests bus control. Therefore, the arbiter assigns master 105 a MEDIUM priority. At time t2, master 101A requests bus control at the same time that data becomes available to master 105. In accordance with the present invention, the arbiter assigns master 101A a MEDIUM priority and changes the priority of master 105 to a HIGH priority. Thus, master 105 is given control of the bus at time t2 until completion of its process at time t5.

In the interim, data is not available to master 101A at time t3. Therefore, at time t3, the arbiter reassigns master 101A a LOW priority. Also at time t3, master 101B requests bus control and is assigned a MEDIUM priority. At time t4, data is available to master 101B. Therefore, the arbiter reassigns master 101B a HIGH priority and allows master 101B to take control of the bus at time t5 (i.e. after the process associated with master 105 is complete). The process performed by master 101B ends at time t6.

Note that at time t5, master 101C requests bus control. However, because data is not available to master 101C at time t6, the arbiter reassigns master 101C a LOW priority. Thus, at this time, both masters 101A and 101C have a LOW priority. At time t7, data is available to master 101C. Therefore, the arbiter reassigns master 101C a HIGH priority and allows master 101C to take control of the bus at time t7.

At time t7, master 105 requests control of the bus and is therefore assigned a MEDIUM priority. At time t8, data becomes available to both masters 101A and 105. In accordance with the present invention, master 105 (previously having a MEDIUM priority) will take control of the bus before master 101A (previously having a LOW priority). Specifically, master 105 will take control at time t9 when the process performed by master 101C is completed. Master 101A will take control of the bus after the process performed by master 105 is complete.

In accordance with the present invention, each target 102 includes a memory interface to facilitate the prioritization process. For example, referring to FIG. 2, target 102A includes an interface 201A to its associated memory 104A and target 102B includes an interface 201B to its associated memory 104B. The following example describes the functionality of memory interface 201A, wherein the functionality of memory interface 201B is identical to that of memory interface 201A. Suppose master 101A requests access to memory 104A. A request REQ#1 is sent to arbiter 103, which assigns master 101A a MEDIUM priority and forwards the request to target 102A. In one embodiment, request REQ#1 is sent to target 102A via memory bus 107a (FIG. 1). However, in other embodiments, request REQ#1 is sent to target 102A via a dedicated line, just as the request/grant signals. Upon receipt of REQ#1, target 102A proceeds to capture the information needed to complete the access of memory 104A.

Figure 5:
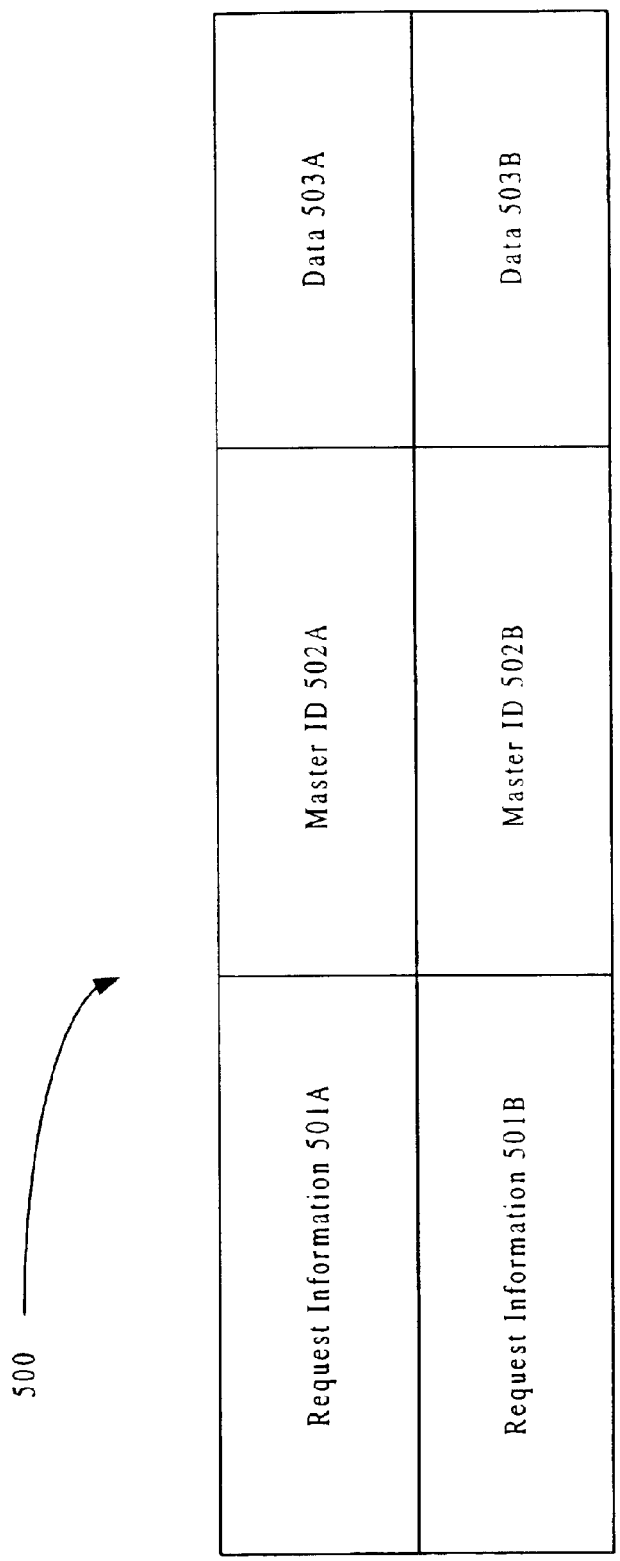
FIG. 5 illustrates an exemplary request queue in accordance with the present invention.

The captured information is stored in a request queue in the interface 201A of target 102A. FIG. 5 illustrates an exemplary request queue 500 including request information 501, a plurality of master identifications (IDs) 502, and data 503. In one embodiment, target 102A generates a master ID 502A using request REQ#1 (i.e., request information 501A) after data 503A is available and stored in request queue 500. Master ID 502A, shown as modified request MREQ#1 in FIG. 2, is then provided to arbiter 103. In one embodiment, modified request MREQ#1 is sent to arbiter 103 via memory bus 107a (FIG. 1). However, in other embodiments, modified request MREQ#1 is sent to arbiter 103 via a dedicated line, just as the request/grant signals.

After arbiter 103 receives modified request MREQ#1, arbiter 103 changes the priority of master 101A to HIGH and, and assuming PCI bus 106 (FIG. 1) is available and no other masters have an earlier HIGH priority, sends a final grant signal GNT#1 to master 101A, thereby allowing master 101A to take control of PCI bus 106. Note that if PCI bus 106 is currently being controlled by another master or if other masters have an earlier HIGH priority, then arbiter 103 allows master 101A to take control of PCI bus 106 at the next earliest time period after the process performed by the last controlling master is complete.

As described in reference to FIG. 4, if data is not available in the next time period (time t3) following request REQ#1 (time t2), then arbiter 103 changes the priority of master 101A to LOW. In this manner, master 101A need not repeat, and indeed in a preferred embodiment is prevented from repeating, REQ#1 if target 102A is not ready to supply the data. As described previously, during the period that master 101A is assigned a LOW priority (in FIG. 4, from time t3 to time t8), arbiter 103 allocates the ownership of PCI bus 106 to another PCI master requesting the bus and having data available (such as master 101B at time t5 and master 101C at time t7).

In accordance with one embodiment of the present invention, target 102A can post different requests into the request queue of interface 201A. In this manner, multiple masters can access the memory of the same target (In fact, because of the sequential servicing of the present invention, multiple masters can even access the same data in a memory.) Elaborating upon the example including master 101A above, assume that master 101B also sends a request REQ#2 to arbiter 103 to access memory 104A of target 102A. In this case, target 102A posts REQ#2 (i.e., request information 501B) from master 101B in request queue 500 (FIG. 4). Note that although only two requests can be processed by request queue 500, other embodiments can include any number of requests with corresponding master Ids and data. Assume further that the data requested by master 101B is available before the data requested by master 101A. In the present invention, a modified request signal MREQ#2 (i.e., Master ID 502B of FIG. 5)(neither shown in FIG. 2) is provided to arbiter 103 before modified request MREQ#1 is provided. Thus, the priority of master 101B changes to HIGH before that of master 101A.

To further increase the efficiency of the present invention, the request queue may include an input/output cache. The cache interposes a block of fast memory between a memory 104 and arbiter 103. A cache controller keeps the cache filled with data or instructions that one or more masters are most likely to need next. In this manner, information can be retrieved without delay (see FIG. 4, for example, in which master 105 posts a request at time t1 and retrieves information at time t2). For most system applications, a cache size of approximately 256 KB is satisfactory.

In one embodiment, a PCI bridge implements the above-described priority scheme of the present invention. As known by those skilled in the art, a bridge is a system building block used to transport data between various buses. A bridge can connect different types of buses. Thus, referring to FIG. 1, a bridge can interconnect PCI bus 106, memory buses 107, and local bus 108. A bridge may be an ASIC device, or may be part of a chipset in the system. In a preferred embodiment, the PCI bridge includes a chipset that integrates targets 102 and arbiter 103.

In summary, the present invention includes a priority scheme implemented by the arbiter in conjunction with the memory interfaces in the target devices. The priority of various requesting masters changes dynamically based on data availability and request state. Using the above features, the present invention maximizes utilization of the PCI bandwidth and throughput.

The specific embodiments of the present invention are presented for purposes of description and illustration only. These embodiments are not intended to be exhaustive or to limit the invention in any way. Those skilled in the art will recognize modifications and variations to the present invention. The present invention is only defined by the appended claims.

What is claimed is:

1. A method of assigning ownership of a peripheral component interconnect (PCI) bus, the method including:

assigning a master a MEDIUM priority level, wherein the master is inactive until the master asserts a request signal when the master wants to take control of the PCI bus;

identifying a target requested by the master;

issuing a provisional grant to the master in response to the request signal;

determining it data associated with the target is available; and assigning a first priority level for ownership of the PCI bus to the master if the data is not available and assigning a second priority level for ownership of the PCI bus to the master if the data is available.

2. The method of claim 1, wherein assigning a first priority level for ownership of the PCI bus to the master if the data is not available comprises assigning a LOW priority level to the master if the data is not available.

3. The method of claim 1, wherein assigning a second priority level for ownership of the PCI bus to the master if the data is available comprises assigning a HIGH priority level to the master if the data is available.

4. The method of claim 1, wherein the target uses delayed transactions to complete a read access.

5. The method of claim 4, wherein the target integrates a buffer management scheme.

6. The method of claim 5, wherein the buffer management scheme includes an input/output cache.

7. The method of claim 1, wherein identifying a target includes sending the request signal from the master to an arbiter.

8. The method of claim 7, wherein assigning a second priority level includes sending a modified request signal to the arbiter.

9. A method of assigning priority to a master on a peripheral component interconnect (PCI) bus, comprising:

assigning a MEDIUM priority to the master;

posting a request by the master to an arbiter to take control of the PCI bus;

issuing a provisional grant by the arbiter to the master;

determining whether data is available from a target associated with the request;

if the data is not available, assigning a LOW priority to the master, wherein the LOW priority is maintained until the data becomes available; and if the data is available, assigning a HIGH priority to the master;

wherein the master is inactive between assigning a MEDIUM priority and posting a request.

10. The method of claim 9, further comprising modifying the request if the data is available, and sending the modified request to the arbiter.

11. The method of claim 10, further comprising if the PCI bus is available, and no other HIGH priority masters have earlier rights to the PCI bus, issuing a final grant by the arbiter to the master to allow the master to take control of the PCI bus.

12. The method of claim 11, further comprising changing the priority of the master back to the MEDIUM priority after transferring the data from the target.

13. A peripheral component interconnect (PCT) bus system comprising:

a PCI bus;

a plurality of masters coupled to the PCI bus, each said master being initially assigned a MEDIUM priority;

a plurality of targets coupled to the PCI bus; and an arbiter which assigns ownership of the PCI bus to said masters, wherein the arbiter issues a preliminary grant to one said master, which posts a request to control the PCI bus to access one said target, wherein if data is not available from the one said target, the arbiter assigns a LOW priority to the one said master, wherein the LOW priority is maintained until the data becomes available, wherein if the data is available from the one said target, the arbiter assigns a HIGH priority to the one said master, wherein the one said master is inactive after being assigned the MEDIUM priority until the one said master posts the request to control the PCI bus.

14. The peripheral component interconnect (PCI) bus system of claim 13, wherein the one said master modifies the request if the data is available, and sends the modified request to the arbiter.

15. The peripheral component interconnect (PCI) bus system of claim 14, wherein if the PCI bus is available, and no other HIGH priority masters have earlier rights to the FCI bus, the arbiter issues a final grant to the one said master to allow the one said master to take control of the PCI bus.

16. The peripheral component interconnect (PCI) bus system of claim 15, wherein the arbiter changes the priority of the master back to the MEDIUM priority after the data has been transferred from the target.

* * * * *

UNITED STATES PATENT AND TRADEMARK OFFICE
CERTIFICATE OF CORRECTION

PATENT NO. : 6,826,644 B1
DATED : November 30, 2004
INVENTOR(S) : Arramreddy et al.

It is certified that error appears in the above-identified patent and that said Letters Patent is hereby corrected as shown below:

Column 8,
Line 12, delete "(PCT)", insert -- (PCI) --.
Line 39, delete "FCI", insert -- PCI --.

Signed and Sealed this

Sixth Day of September, 2005

JON W. DUDAS
*Director of the United States Patent and Trademark Office*